US006940907B1

(12) United States Patent
Chen et al.

(10) Patent No.: US 6,940,907 B1
(45) Date of Patent: Sep. 6, 2005

(54) METHOD FOR MOTION ESTIMATION

(75) Inventors: Yi-Kai Chen, Tainan (TW); Te-Chien Chen, Taipei (TW)

(73) Assignee: Ulead Systems, Inc., Taipei (TW)

( * ) Notice: Subject to any disclaimer, the term of this patent is extended or adjusted under 35 U.S.C. 154(b) by 0 days.

(21) Appl. No.: 10/834,006

(22) Filed: Apr. 29, 2004

(30) Foreign Application Priority Data

Mar. 31, 2004 (JP) .............................. 2004-102756

(51) Int. Cl.$^7$ ............................................. H04N 7/12
(52) U.S. Cl. ............ 375/240.16; 375/240; 375/240.01; 375/240.12
(58) Field of Search ........................... 375/240.16, 240, 375/240.01, 240.12

(56) References Cited

U.S. PATENT DOCUMENTS 6,810,081 B2 * 10/2004 Dantwala ............... 375/240.16

6,845,130 B1 * 1/2005 Han et al. ............... 375/240.16

* cited by examiner

Primary Examiner—Allen Wong
(74) Attorney, Agent, or Firm—Birch, Stewart, Kolasch & Birch, LLP

(57) ABSTRACT

A method for motion estimation. The method includes a) dividing a search area into sub-areas with different densities, b) deriving distortions of a currently selected macro-block and its neighbors determined by the density of the current sub-area, c) if one of the distortions of the neighbors is smallest, identifying the neighbor as the current macro-block, d) repeating steps b) and c) until the current macro-block has the smallest distortion, e) if the current macro-block having the smallest distortion is not located in the sub-area having the largest density, re-defining the search area according to the density of the current sub-area, and f) repeating steps a), b), c), d) and e) until the current macro-block having the smallest distortion is located in the sub-area having the largest density, identified as the reference macro-block.

12 Claims, 10 Drawing Sheets

METHOD FOR MOTION ESTIMATION

This Non-provisional application claims priority under 35 U.S.C. § 119(a) on Patent Application No(s). 2004-102756 filed in Japan on Mar. 31, 2004, the entire contents of which are hereby incorporated by reference.

BACKGROUND OF THE INVENTION

1. Field of the Invention

The present invention relates to motion estimation and particularly to a spiderweb search method for motion estimation to identify the reference macro-block.

2. Description of the Related Art

An MPEG video sequence is comprised of one or more groups of pictures, each group of which is composed of one or more pictures of type I-, P-, or B-. Intra-coded pictures, or "I-pictures," are coded independently without reference to any other pictures. Predictive-coded pictures, or "P-pictures," use information from preceding reference pictures, while bi-directionally predictive-coded pictures, or "B-pictures," may use information from preceding or upcoming pictures, both, or neither.

Motion estimation is the process of estimating the displacement of a portion of an image between neighboring pictures. For example, a moving soccer ball will appear in different locations in adjacent pictures. Displacement is described as the motion vectors that give the best match between a specified region, e.g., the ball, in the current picture and the corresponding displaced region in a preceding or upcoming reference picture. The difference between the specified region in the current picture and the corresponding displaced region in the reference picture is referred to as "residue".

In general, two known types of motion estimation methods used to estimate the motion vectors are pixel-recursive algorithms and block-matching algorithms. Pixel-recursive techniques predict the displacement of each pixel iteratively from corresponding pixels in neighboring frames. Block-matching algorithms, on the other hand, estimate the displacement between frames on a block-by-block basis and choose vectors that minimize the difference.

In conventional block-matching processes, the current image to be encoded is divided into equal-sized blocks of pixel information. In MPEG-1 and MPEG-2 video compression standards, for example, the pixels are grouped into "macro-blocks," each consisting of a 16×16 sample array of luminance samples together with one 8×8 block of samples for each of the two chrominance components. The 16×16 array of luminance samples further comprises four 8×8 blocks that are typically used as input blocks to the compression models.

A block-matching algorithm that compares the current block to every candidate block within the search range is called a "full search". In general, larger search areas generally produce a more accurate displacement vector, however, the computational complexity of a full search is proportional to the size of the search area and is too slow for some applications. A full search block-matching algorithm applied on a macro-block of size 16×16 pixels over a search range of ±N pixels with one pixel accuracy, for example, requires $(2 \times N+1)_2$ block comparisons. For N=16, 1089 16×16 block comparisons are required. Because each block comparison requires 16×16, or 256, calculations, this method is computationally intensive and operationally very slow. Techniques that simply reduce the size of the search area, however, run a greater risk of failing to find the optimal matching block.

As a result, there has been much emphasis on producing fast algorithms for finding the matching block within a wide search range. Most fast search techniques gain speed by computing the displacement only for a sparse sampling of the full search area. The 2-D logarithmic search, for example, reduces the number of computations by computing the MSE for sparsely-spaced candidates, and then successively searching the closer spaced candidates surrounding the best candidate found in the previous iteration. In a conjugate direction search, the algorithm searches in a horizontal direction until a minimum distortion is found. Then, proceeding from that point, the algorithm searches in a vertical direction until a minimum is found. Both of these methods are faster than a full search but frequently fail to locate the optimal matching block.

Other methods for overcoming the disadvantages of a full search have employed hierarchical search techniques. In a first stage, for example, a coarse search is performed over a reasonably large area. In successive stages of a conventional hierarchical search, the size of the search area is reduced. One example of a three-step hierarchical search is described in H. M. Jong et al., "Parallel Architectures for 3-Step Hierarchical Search Block-Matching Algorithm," IEEE Trans. On Circuits and Systems for Video Technology, Vol. 4, August 1994, pp. 407–416. The hierarchical search described in Jong et al. is inadequate for some applications because the coarse search does not utilize all of the pixel information and thus may form an incorrect starting point for the finer search.

SUMMARY OF THE INVENTION

The object of the present invention is to provide a fast and effective method for motion estimation adopting a spiderweb search method to identify a reference macro-block.

The present invention provides a method for motion estimation to determine a motion vector from a macro-block to be encoded to a reference macro-block. The method includes the steps: a) dividing a search area into sub-areas respectively having different densities, b) deriving distortions respectively between the macro-block to be encoded and a currently selected macro-block, and the macro-block to be encoded and neighbors of the currently selected macro-block, wherein the neighbors are determined according to the density of the sub-area in which the currently selected macro-block is located, c) if one of the distortions between the neighbors and the macro-block to be encoded is smallest, identifying the neighbor having the smallest distortion as the currently selected macro-block, d) repeating steps b) and c) until the currently selected macro-block has the smallest distortion among the neighbors thereof, e) if the currently selected macro-block having the smallest distortion is located a sub-area other than that having the largest density, re-defining the search area according to the density of the sub-area in which the currently selected macro-block is located, f) repeating steps a), b), c), d) and e) until the currently selected macro-block having the smallest distortion is located in the sub-area having the largest density, and g) identifying the currently selected macro-block having the smallest distortion and located in the sub-area having the largest density as the reference macro-block.

The present invention provides another method for motion estimation to determine a motion vector from a macro-block to be encoded to a reference macro-block. This method includes the steps: a) dividing a search area into sub-areas respectively having different densities, b) deriving distortions respectively between the macro-block to be encoded and a currently selected macro-block (X,Y), and the macro-block to be encoded and eight neighbors ($X+D_m$, $Y-D_m$), ($X+D_m$, Y), ($X+D_m$, $Y+D_m$), (X, $Y-D_m$), (X, $Y+D_m$), ($X-D_m$, $Y-D_m$), ($X-D_m$,Y), ($X-D_m$,$Y+D_m$) of the currently selected macro-block, wherein $1/D_m$ is the density of the sub-area in which the currently selected macro-block (X,Y) is located, c) if one of the distortions between the neighbors and the macro-block to be encoded is smallest, identifying the neighbor having the smallest distortion as the currently selected macro-block, d) repeating steps b) and c) until the currently selected macro-block has the smallest distortion among the neighbors thereof, e) if the currently selected macro-block having the smallest distortion is located in one of the sub-areas other than that having the largest density, re-defining the search area and dividing the re-defined search area into sub-areas respectively having densities $1/D_1, \ldots, 1/D_p$, wherein $1/D_m'$ is the density of the sub-area in which the currently selected macro-block is located and $D_1+ \ldots +D_{(p-1)} \leq D_m' \leq D+ \ldots +D_p$, f) repeating steps b), c), d) and e) until the currently selected macro-block having the smallest distortion is located in the sub-area having the largest density, and g) identifying the currently selected macro-block having the smallest distortion and located in the sub-area having the largest density as the reference macro-block.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 1:
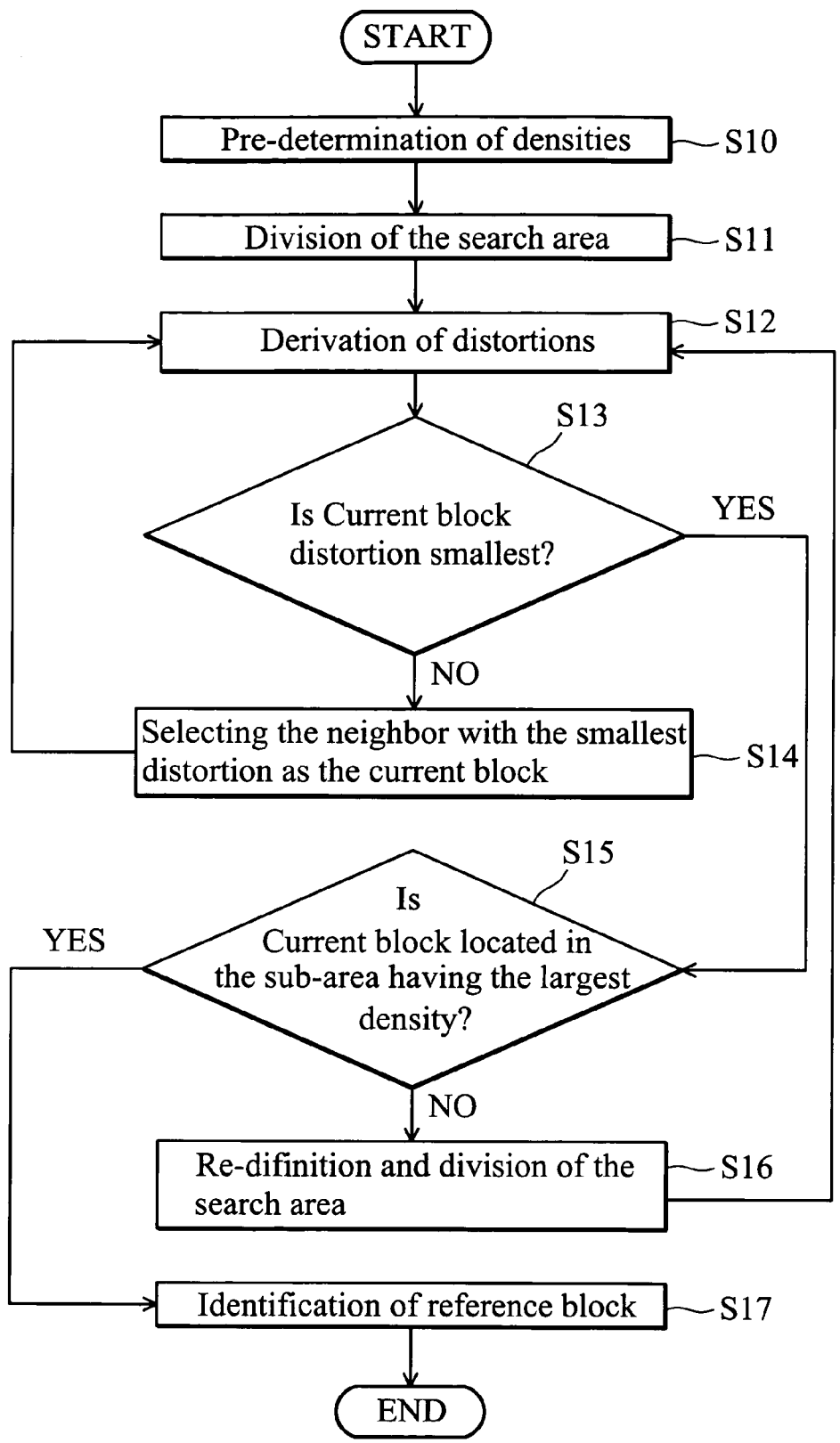
FIG. 1 is a flowchart of a method for motion estimation according to one embodiment of the invention.

FIG. 1 is a flowchart of a method for motion estimation according to one embodiment of the invention. The object of the motion estimation is to determine a motion vector from a macro-block to be encoded to a reference macro-block. The encoded and reference macro-blocks may reside in two different frames. The steps shown in FIG. 1 are described with reference to examples shown in FIGS. 2A~2I in the following.

In step S10, n discrete densities $1/D_1 \sim 1/D_n$ are pre-determined, such as 4 densities of 1, ½, ⅓ and ¼.

In step S11, the search area is initially comprised of all macro-blocks in a frame and divided into sub-areas respectively having the densities $1/D_1 \sim 1/D_n$. The sub-areas are ring-like and concentric at an initially selected macro-block ($x_i, y_i$), and the density of a sub-area closer to the center macro-block is larger. More specifically, a sub-area having a density $1/D_m (1 \leq m \leq n)$ comprises macro-blocks (X,Y) wherein X and Y conform to the following equations:

$$\begin{cases} [x_i + (D_1 + \ldots + D_{(m-1)}) + 1 \leq X \leq x_i + (D_1 + \ldots + D_m)] \text{or} [x_i - (D_1 + \ldots + D_{(m-1)}) - 1 \geq X \geq x_i - (D_1 + \ldots + D_m)] \\ [y_i + (D_1 + \ldots + D_{(m-1)}) + 1 \leq Y \leq y_i + (D_1 + \ldots + D_m)] \text{or} [y_i - (D_1 + \ldots + D_{(m-1)}) - 1 \geq Y \geq y_i - (D_1 + \ldots + D_m)] \end{cases}$$

Figure 2A:
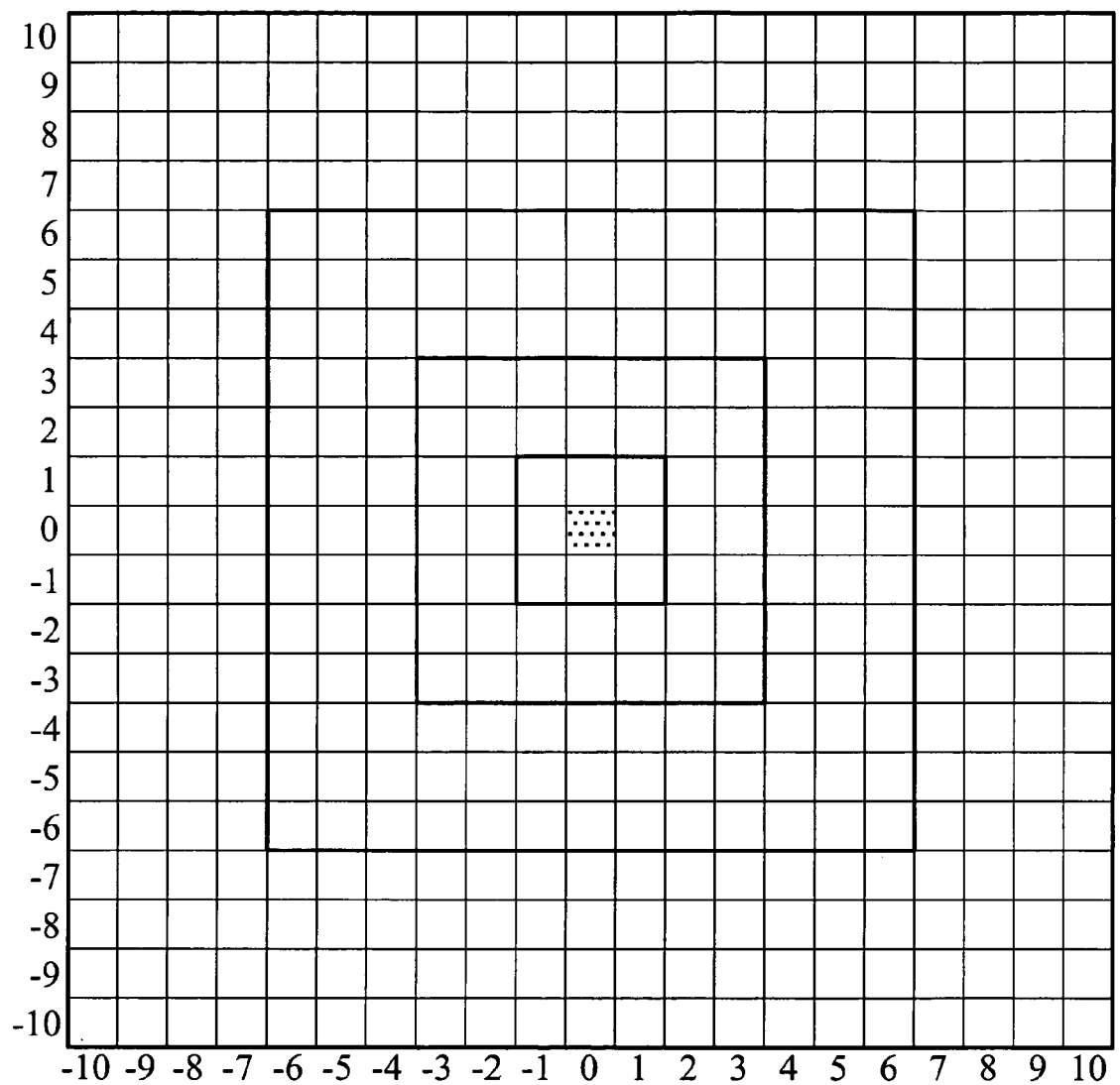
FIGS. 2A~2I are diagrams showing an exemplary implementation of the method shown in FIG. 1.

As shown in FIG. 2A, the search area is a 21×21 array of macro-blocks and the macro-block (0,0) is initially selected. The search area is divided into four sub-areas respectively having densities 1, ½, ⅓ and ¼ such that, for example, the sub-area having the density ⅓ comprises the macro-blocks (X,Y) wherein $4 \leq X \leq 6$ or $-4 \geq X \geq -6$, and $4 \leq Y \leq 6$ or $-4 \geq Y \geq -6$. It should be noted that the initially selected macro-block is preferably located at a position in the referenced frame the same as that of the macro-block to be encoded in the encoded frame.

Figure 2B:
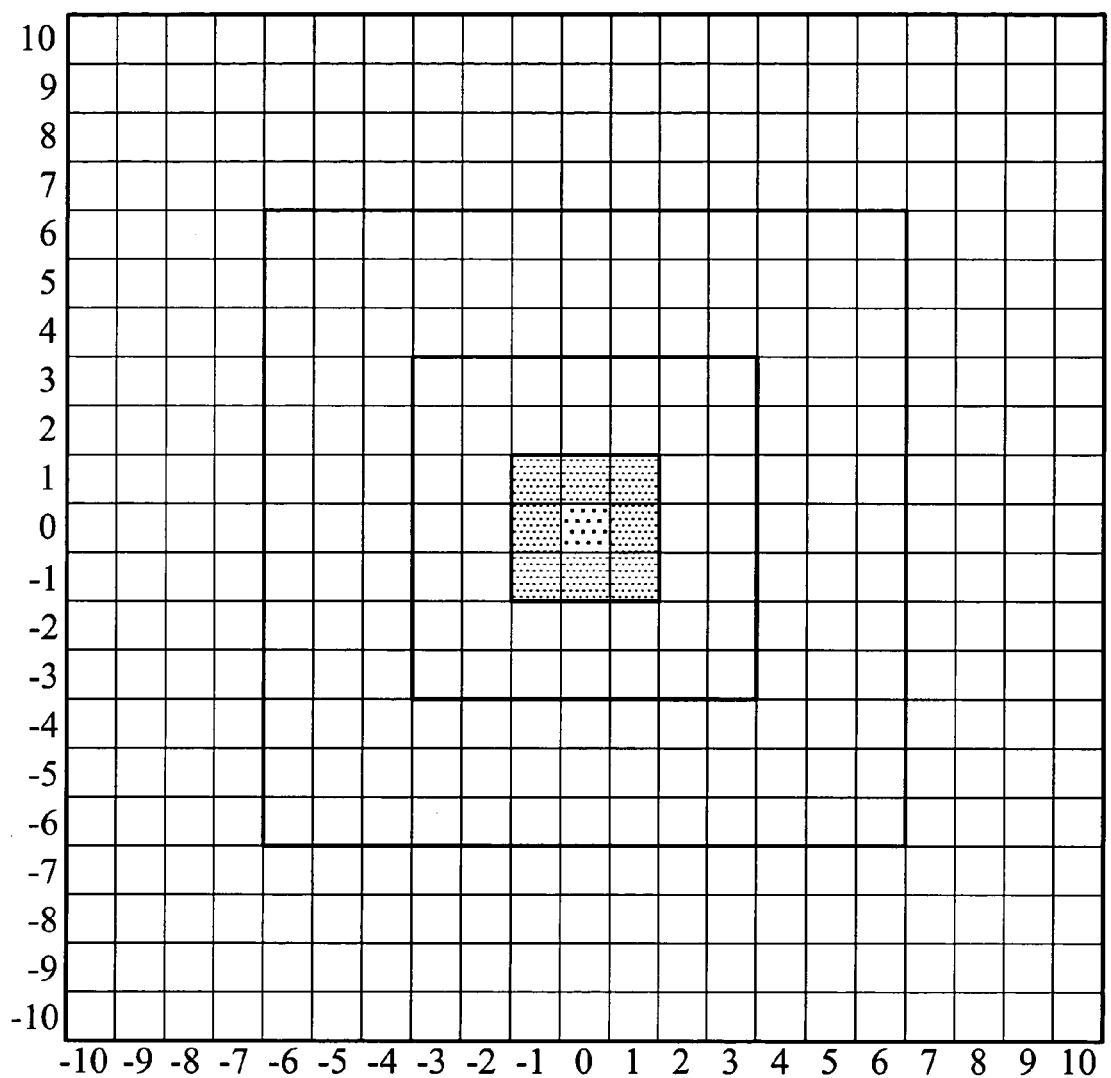

In step S12, distortions respectively between the macro-block to be encoded and a currently selected macro-block, and the macro-block to be encoded and neighbors of the currently selected macro-block are derived. The neighbors are determined according to the density of the sub-area in which the currently selected macro-block is located. More specifically, the neighbors of a currently selected macro-block (X,Y) in a sub-area having a density $1/D_m$ are located at ($X+D_m$,Y), ($X-D_m$,Y), ($X+D_m$,$Y-D_m$), (X,$Y-D_m$), ($X-D_m$,$Y-D_m$), ($X+D_m$,$Y+D_m$), (X, $Y+D_m$) and ($X-D_m$,$Y+D_m$). As shown in FIG. 2B, the distortions of the initially selected macro-block and its neighbors are derived. The initially selected macro-block is located in the sub-area having the density 1 so that its neighbors are located at (1,1), (1,0), (1,–1), (0,1), (0,–1), (–1,1), (–1,0) and (–1,–1). Each distortion is preferably a sum of absolute distance, a mean square error, or a mean absolute difference between two macro-blocks.

In step S13, it is determined whether the distortion between the currently selected macro-block and the macro-block to be encoded is smallest. If so, the procedure goes to step S15; otherwise, the procedure goes to step S14.

Figure 2C:
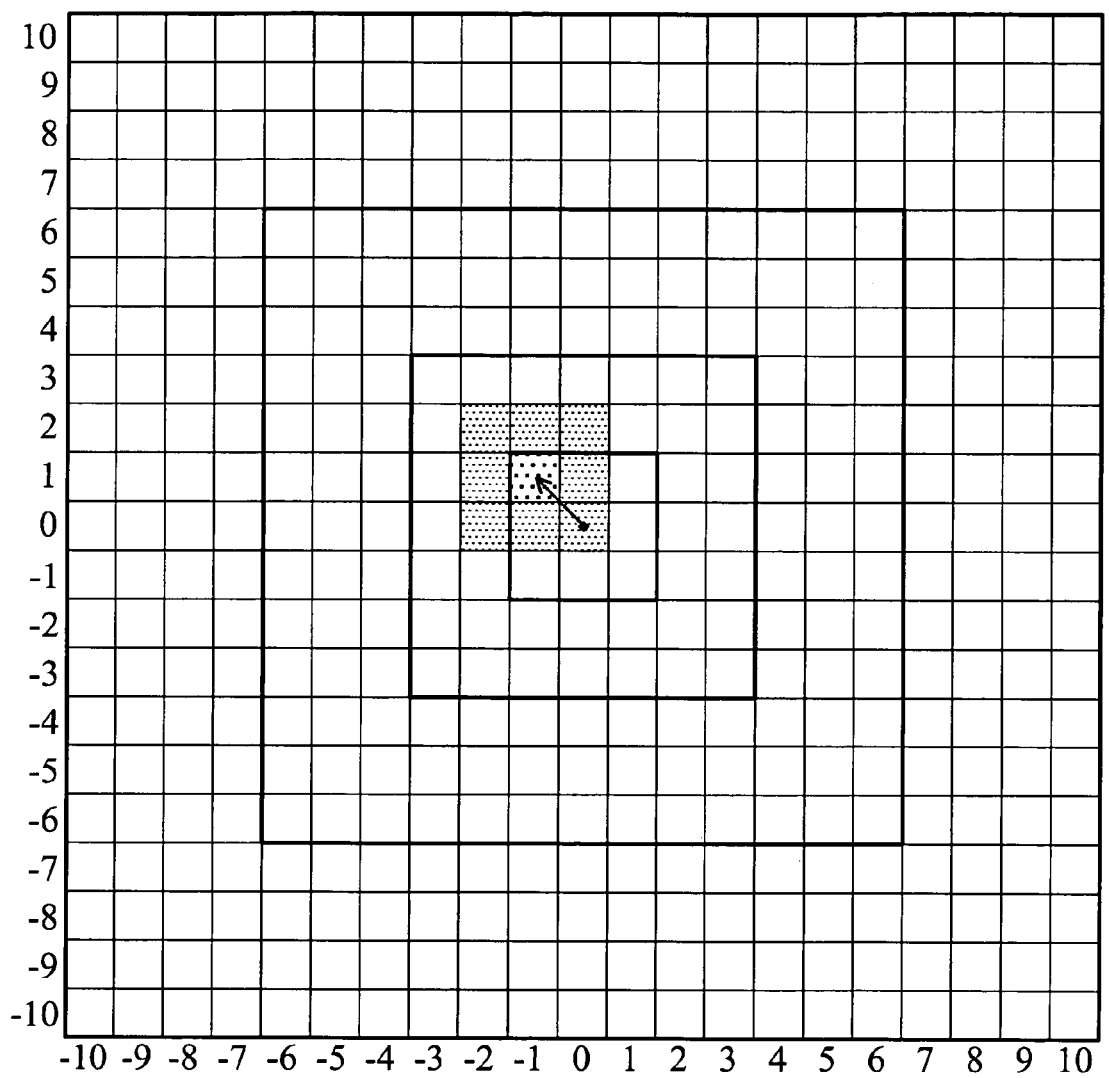
Figure 2D:
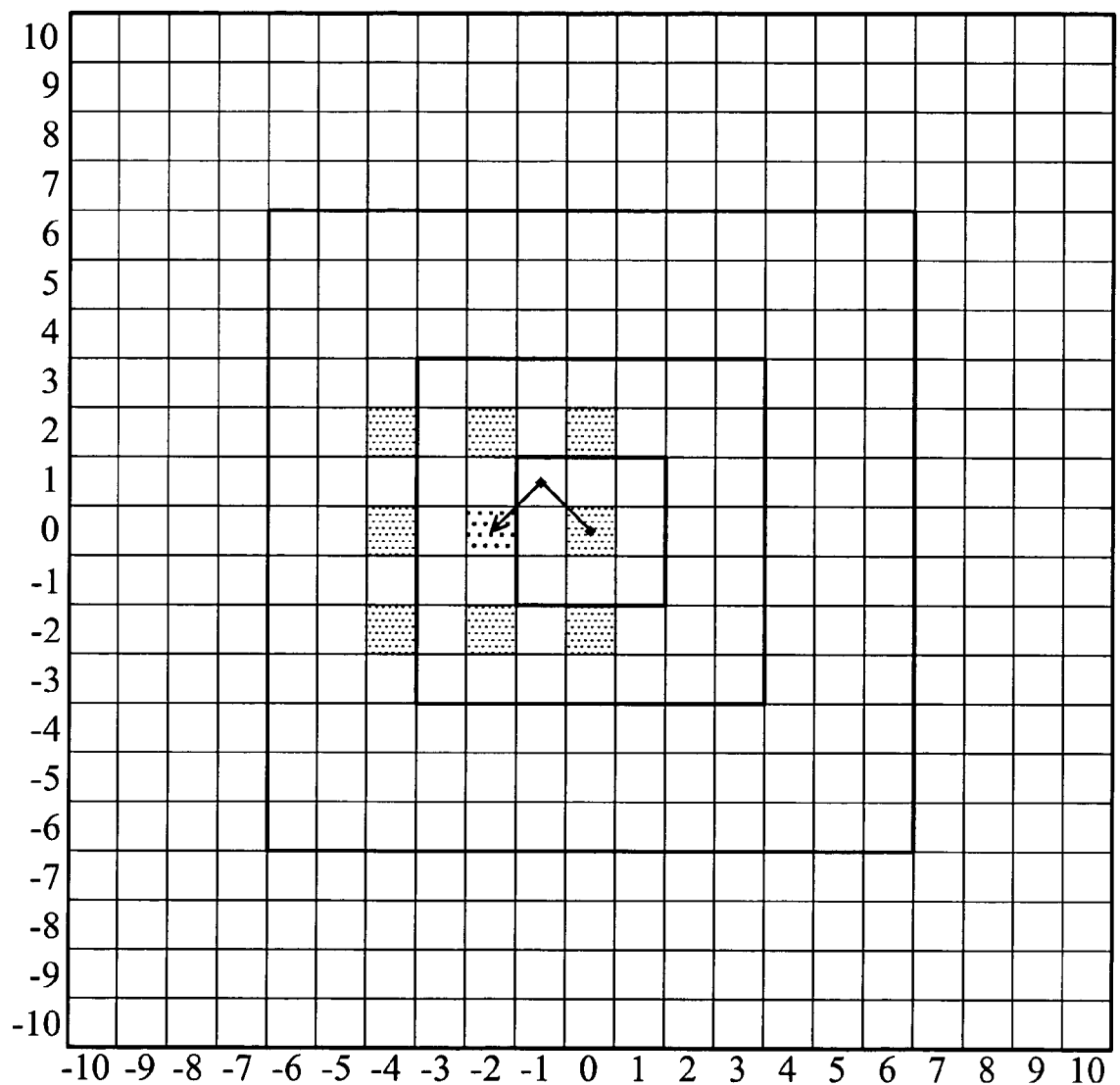
Figure 2E:
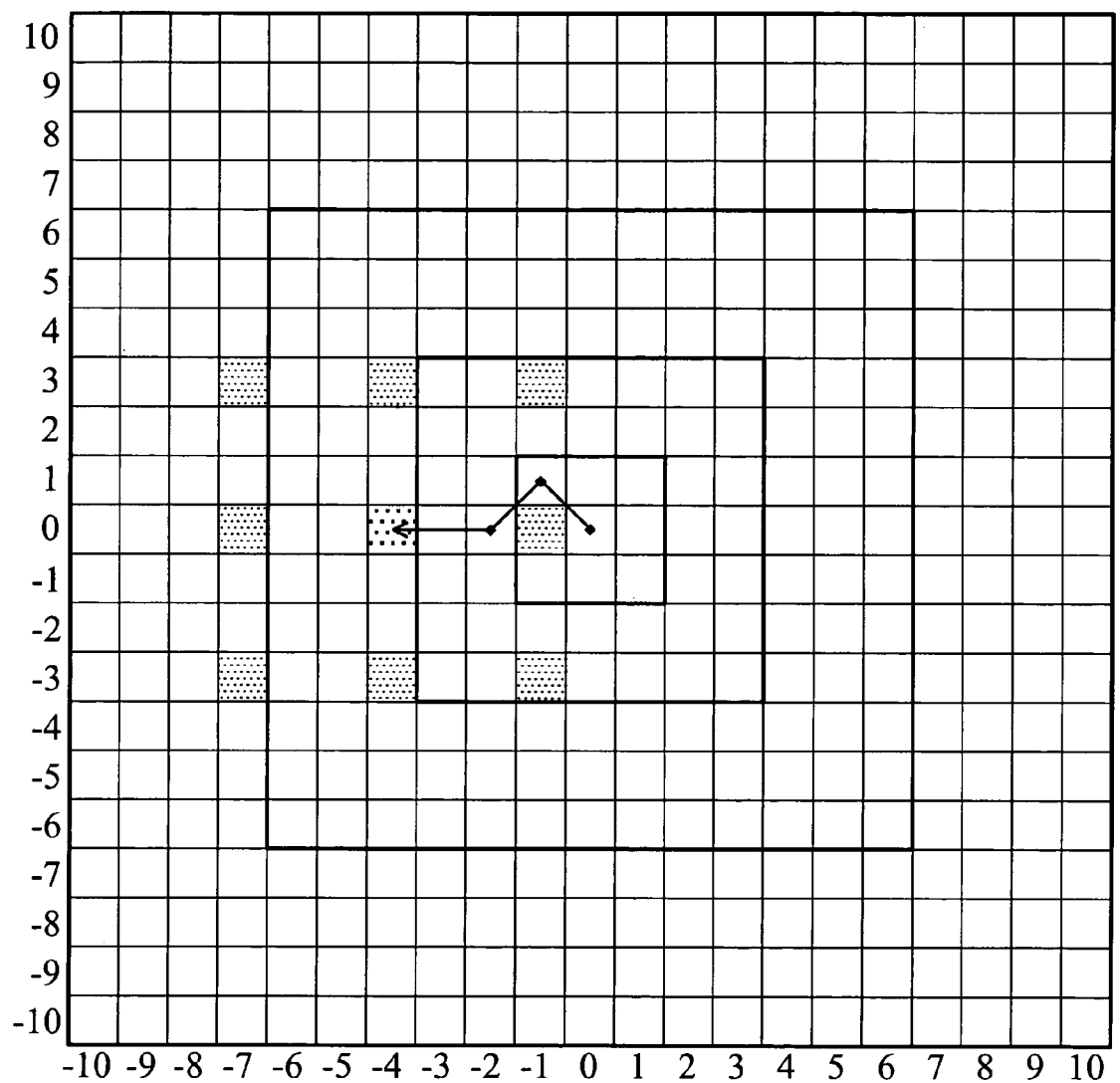
Figure 2F:
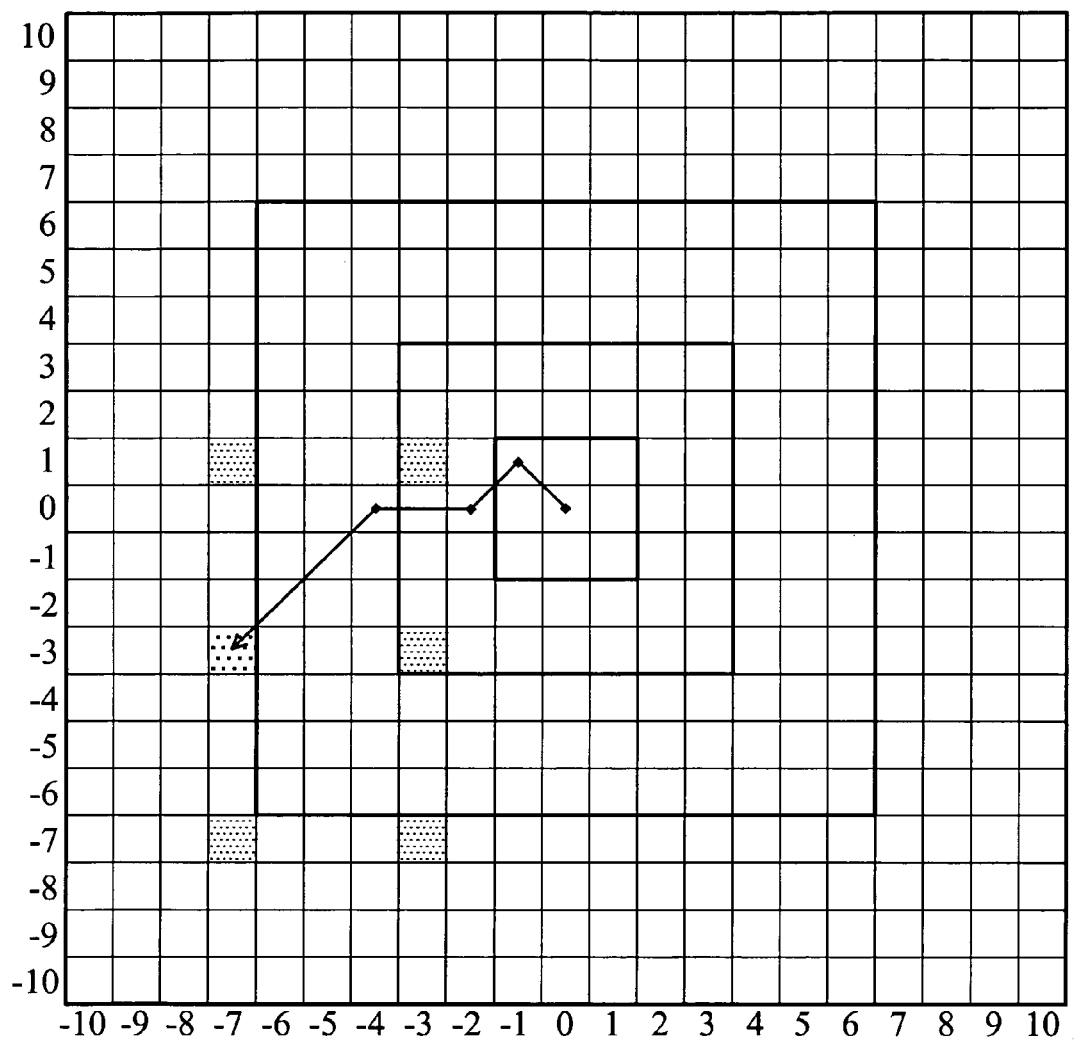

In step S14, the neighbor having the smallest distortion is identified as the currently selected macro-block. The procedure then returns to step S12. FIGS. 2C~2F show the iterations of steps S12~S14. As shown in FIG. 2C, the neighbor (−1,1) has the smallest distortion with the macro-block to be encoded and accordingly is identified as the currently selected macro-block. The newly selected macro-block (−1,1) is still located in the sub-area having the density 1 so that its neighbors are located at (−2,2), (−2,1), (−2,0), (−1,2), (−1,0), (0,2), (0,1) and (0,0). Then, as shown in FIG. 2D, the neighbor (−2,0) has the smallest distortion and accordingly is identified as the currently selected macro-block. The newly selected macro-block (−2,0) is now located in the sub-area having the density ½ so that its neighbors are located at (−4,2), (−4,0), (−4,−2), (−2,2), (−2,−2), (0,2), (0,0) and (0,−2). Next, as shown in FIG. 2E, the neighbor (−4,0) has the smallest distortion and accordingly is identified as the currently selected macro-block. The newly selected macro-block (−4,0) is located in the sub-area having the density ⅓ so that its neighbors are located at (−7,3), (−7,0), (−7,−3), (−4,3), (−4,−3), (−1,3), (−1,0) and (−1,−3). As shown in FIG. 2F, among the neighbors of the macro-block (−4,0), the macro-block (−7,−3) has the smallest distortion and accordingly is identified as the currently selected macro-block. The newly selected macro-block (−7,−3) is located in the sub-area having the density ¼ so that its neighbors are located at (−7,1), (−7,−7), (−3,1), (−3,−3) and (−3,−7). It should be noted that the macro-block (−7,−3) only has five neighbors since the others are out of the search area.

In step S15, it is further determined whether the currently selected macro-block having the smallest distortion is located in the sub-areas having the largest density. If so, the procedure goes to step S17; otherwise, the procedure goes to step S16.

Figure 2G:
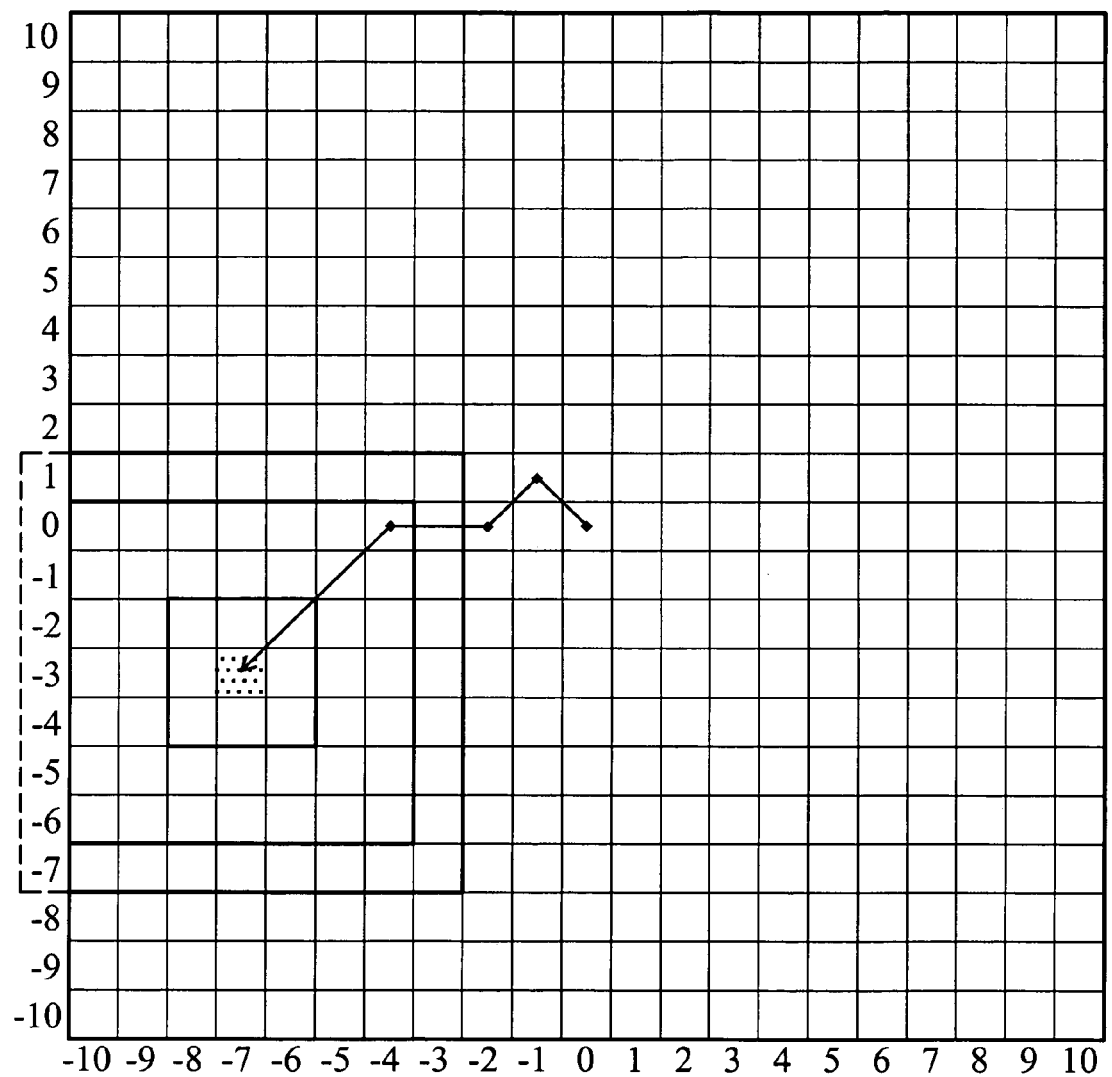
Figure 2H:
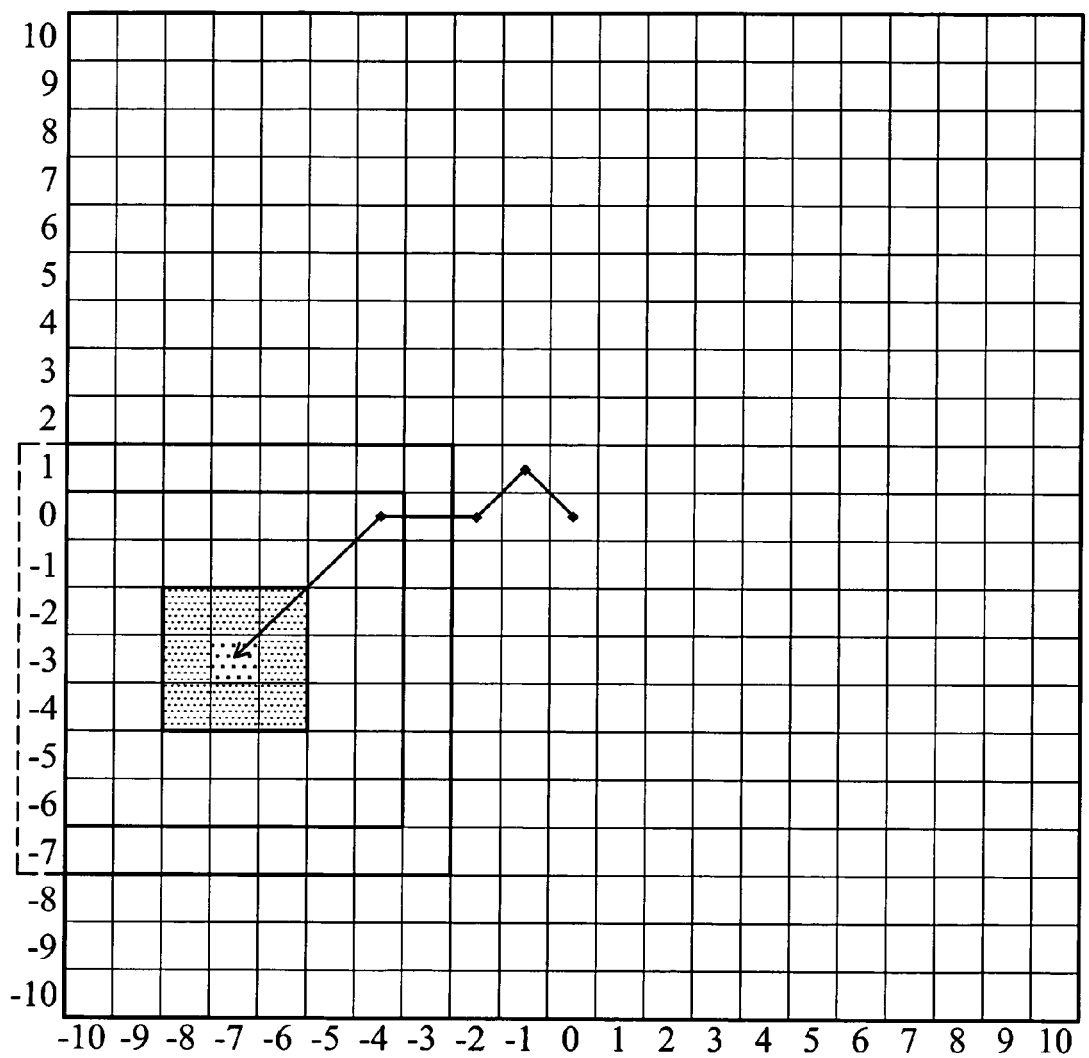
Figure 2I:
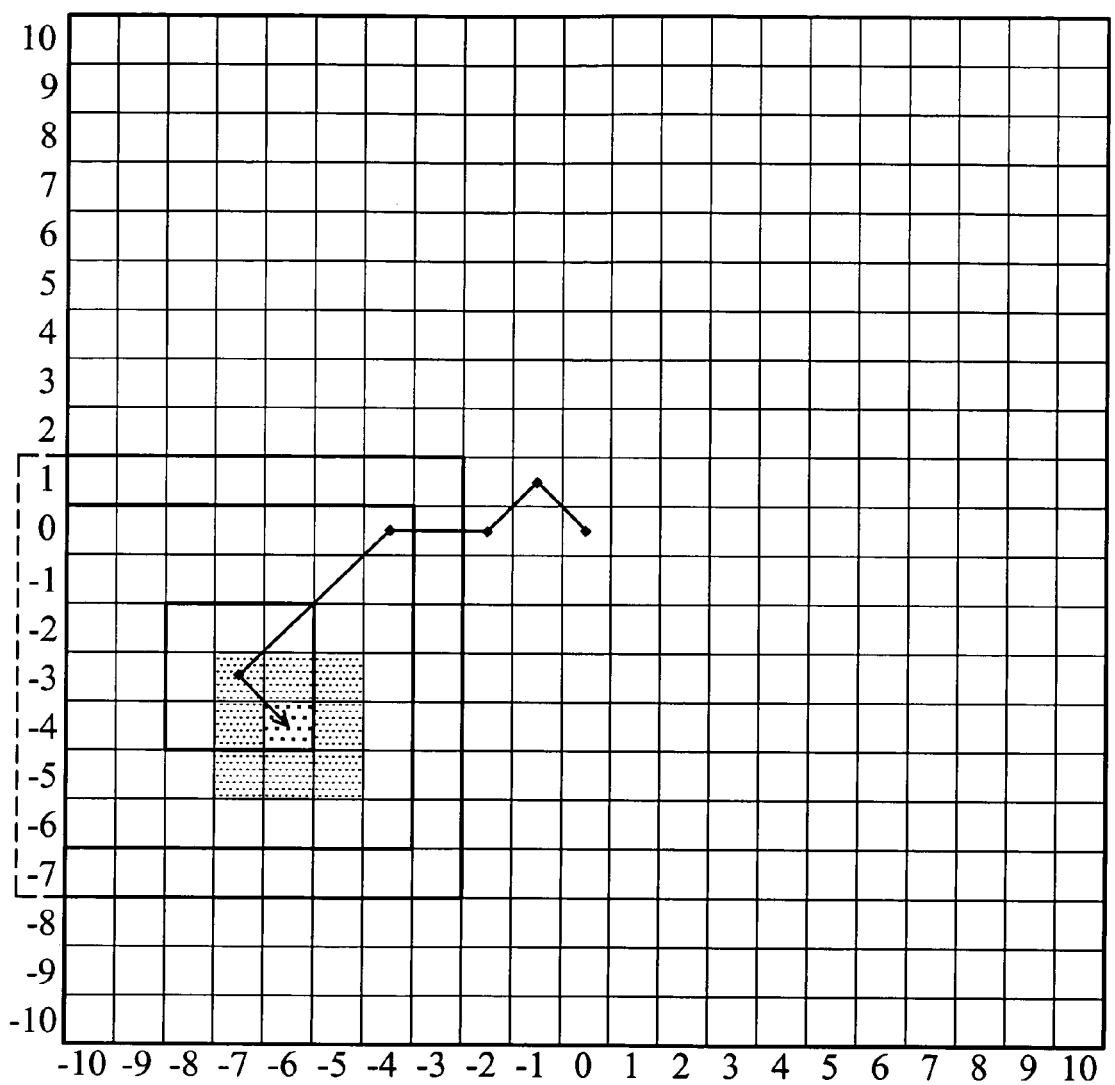

In step S16, the search area is re-defined and re-divided according to the density of the sub-area in which the currently selected macro-block is located. More specifically, if the currently selected macro-block $(x_c, y_c)$ is located in a sub-area having a density $1/D_m$, the search area is re-defined as an area comprising macro-blocks (X,Y) wherein $x_c - D_m \leq X \leq x_c + D_m$ and $y_c - D_m \leq Y \leq y_c + D_m$. The newly defined search area is divided into sub-areas having the densities $1/D_1 \sim 1/D_p$ ($1 \leq p \leq n$) in a manner the same as the step S11, wherein $D_1 + \ldots + D_{(p-1)} \leq D_m \leq D_1 + \ldots + D_p$. As shown in FIG. 2G, since the currently selected macro-block is located at (−7,−3) and in the sub-area having a density ¼, the search area is re-defined to comprise macro-blocks (X,Y) wherein $-10 \leq X \leq -3$ and $-7 \leq Y \leq 1$. It is noted that the region (−11,Y) outside of the frame is excluded. Further, the newly defined search area is divided into three sub-areas respectively having densities 1, ½ and ⅓ since $\leq 14 + \leq 21 + 2 + 3$. After, the procedure returns to step S12. As shown in FIG. 2H, the current selected macro-block (−7,−3) is located in the new sub-area having the density 1 such that its neighbors are located at (−8,−4), (−8,−3), (−8,−2), (−7,−4), (−7,−2), (−6,−4), (−6,−3) and (−6,−2). Among the neighbors of the macro-block (−7,−3), the macro-block (−6,−4) has the smallest distortion with the macro-block to be encoded and is accordingly identified as the currently selected macro-block, as shown in FIG. 2I. Finally, the macro-block (−6,−4) has the smallest distortion and is located in the sub-area having the largest density 1, determined in the step S15. Consequently, the procedure goes to the step S17.

In step S17, the currently selected macro-block having the smallest distortion and located in the sub-area having the largest density is identified as the reference macro-block. As a result, the motion vector of the macro-block to be encoded is determined.

From simulation results, performance improvement is shown when adopting the spiderweb search method to every test video sequence. The spiderweb search method may be integrated into a diamond or 2D log search method to increase speed. The spiderweb search method reduces the number of checkpoints for reference macro-block and has minimal impact on PSNR degradation.

In the previously described method, it is noted that the distance between the neighbors are inversely proportional to the density of the region they are located in. The search area may not be rectangular. The number of the neighbors may be, for example, 4 and needs not to be 8.

In conclusion, the present invention provides a fast and effective method for motion estimation adopting a spiderweb search method to identify a reference macro-block. The spiderweb search is easily implemented or applied to other estimation algorithms to further reduce computational complexity without sacrificing compression quality.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for motion estimation to determine a motion vector from a macro-block to be encoded to a reference macro-block, comprising the steps of:

a) dividing a search area into sub-areas respectively having different densities;

b) deriving distortions respectively between the macro-block to be encoded and a currently selected macro-block, and the macro-block to be encoded and neighbors of the currently selected macro-block, wherein the neighbors are determined according to the density of the sub-area in which the currently selected macro-block is located;

c) if one of the distortions between the neighbors and the macro-block to be encoded is smallest, identifying the neighbor having the smallest distortion as the currently selected macro-block;

d) repeating steps b) and c) until the currently selected macro-block has the smallest distortion among the neighbors thereof;

e) if the currently selected macro-block having the smallest distortion is located in one of the sub-areas other than that having the largest density, re-defining the search area according to the density of the sub-area in which the currently selected macro-block is located;

f) repeating steps a), b), c), d) and e) until the currently selected macro-block having the smallest distortion is located in the sub-area having the largest density; and g) identifying the currently selected macro-block having the smallest distortion and located in the sub-area having the largest density as the reference macro-block.

2. The method as claimed in claim 1, wherein the encoded and reference macro-blocks reside in different frames.

3. The method as claimed in claim 1, wherein the distortion is a sum of absolute distortion or mean square error.

4. The method as claimed in claim 1, wherein the search area is divided so that the sub-areas are ring-like and concentric at the center of the search area.

5. The method as claimed in claim 4, wherein the sub-areas closer to the center of the search area have larger densities.

6. A method for motion estimation to determine a motion vector from a macro-block to be encoded to a reference macro-block, comprising the steps of:

a) dividing a search area into sub-areas respectively having different densities;

b) deriving distortions respectively between the macro-block to be encoded and a currently selected macro-block (X,Y), and the macro-block to be encoded and eight neighbors $(X+D_m, Y-D_m)$, $(X+D_m, Y)$, $(X+D_m, Y+D_m)$, $(X, Y-D_m)$, $(X, Y+D_m)$, $(X-D_m, Y-D_m)$, $(X-D_m, Y)$, $(X-D_m, Y+D_m)$ of the currently selected macro-block, wherein $1/D_m$ is the density of the sub-area in which the currently selected macro-block (X,Y) is located;

c) if one of the distortions between the neighbors and the macro-block to be encoded is smallest, identifying the neighbor having the smallest distortion as the currently selected macro-block;

d) repeating the steps b) and c) until the currently selected macro-block has the smallest distortion among the neighbors thereof;

e) if the currently selected macro-block having the smallest distortion is located in one of the sub-areas other than that having the largest density, re-defining the search area and dividing the re-defined search area into sub-areas respectively having densities $1/D_1, \ldots, 1/D_p$, wherein $1/D_m'$ is the density of the sub-area in which the currently selected macro-block is located and $D_1 + \ldots + D_p \leq D_m' \leq D_1 + \ldots + D_{(p+1)}$;

f) repeating steps b), c), d) and e) until the currently selected macro-block having the smallest distortion is located in the sub-area having the largest density; and g) identifying the currently selected macro-block having the smallest distortion and located in the sub-area having the largest density as the reference macro-block.

7. The method as claimed in claim 6, wherein the encoded and reference macro-blocks reside in different frames.

8. The method as claimed in claim 6, wherein the distortion is a sum of absolute distortion or mean square error.

9. The method as claimed in claim 6, wherein the search area is divided so that the sub-areas are ring-like and concentric at the currently selected macro-block.

10. The method as claimed in claim 9, wherein a sub-area having a density $1/D_m (1 \leq m \leq n)$ comprises macro-blocks (X,Y) conforming to the equations:

$$\begin{cases} [x_i + (D_1 + \ldots + D_{(m-1)}) + 1 \leq X \leq x_i + (D_1 + \ldots + D_m)] \text{or} [x_i - (D_1 + \ldots + D_{(m-1)}) - 1 \geq X \geq x_i - (D_1 + \ldots + D_m)] \\ [y_i + (D_1 + \ldots + D_{(m-1)}) + 1 \leq Y \leq y_i + (D_1 + \ldots + D_m)] \text{or} [y_i - (D_1 + \ldots + D_{(m-1)}) - 1 \geq Y \geq y_i - (D_1 + \ldots + D_m)] \end{cases}$$

11. The method as claimed in claim 9, wherein the sub-areas closer to the currently selected macro-block have the larger densities.

12. The method as claimed in claim 6, wherein the search area is re-defined as an area comprising macro-blocks (X,Y) conforming to equations $x_c - D_m \leq X \leq x_c + D_m$ and $y_c - D_m \leq Y \leq y_c + D_m$, if the currently selected macro-block is located at $(x_c, y_c)$ and in a sub-area having a density $1/D_m$.

* * * * *